United States Patent Office 3,384,784
Patented May 21, 1968

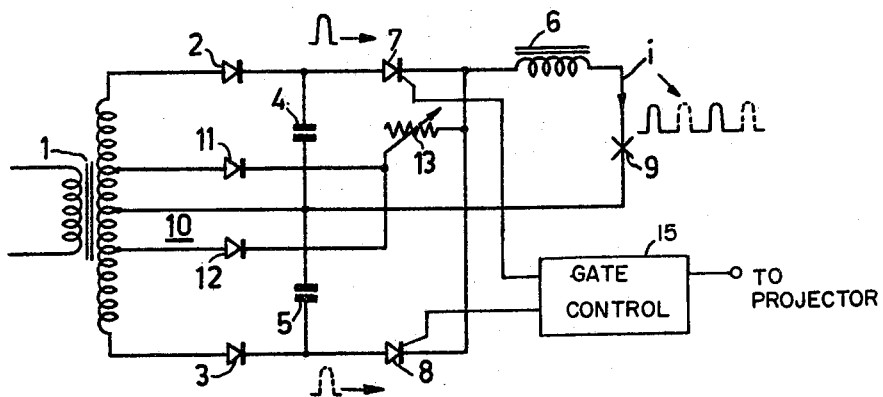

3,384,784
FILM PROJECTOR
Piet Hoekstra, Emmasingel, Eindhoven, Netherlands, assignor to North American Philips Company, Inc., New York, N.Y., a corporation of Delaware
Filed Sept. 20, 1965, Ser. No. 488,506
Claims priority, application Netherlands, Sept. 24, 1964, 64—11,120
5 Claims. (Cl. 315—227)

The invention relates to a film projector comprising an electric light source in the form of a gas or vapour-filled high-pressure discharge lamp, which is energized by means of a pulse circuit in order to produce flashes. A problem that frequently occurs with film projectors is that at the time the film projector is first started, the discharge lamp does not ignite easily. The invention is characterized in that the discharge lamp is connected to an auxiliary circuit which supplies, at the start of the projector, an additional current, which is subsequently switched off by the rising burning voltage of the discharge lamp.

The invention has for its object to eliminate the above-mentioned disadvantage. The additional current heats more strongly the contents of the discharge lamp. If the lamp is filled with mercury, a more rapid evaporation of the mercury is obtained. There is produced an arc discharge with a counter voltage which reduces the additional current until it has completely disappeared, since the counter voltage exceeds the voltage supplied by the auxiliary circuit.

In a particularly advantageous embodiment, the auxiliary circuit is built up from a number of rectifiers which are connected to the supply transformer of the supply circuit for the pulse circuit, and to the discharge lamp through a variable resistor.

The invention will be described more fully with reference to the drawing.

In the figure there is shown a supply set for a discharge lamp 9, in which a transformer 1 supplies the supply voltage for a full-wave rectifier composed of rectifying diodes 2 and 3. To each phase is connected a pulse circuit which comprises pulse capacitors 4 and 5, respectively, and an inductor 6. The pulse circuits supply pulses which are 180° out of phase relative to each other. The pulses are supplied through controlled relay tubes 7, 8 to the discharge lamp 9. A control-voltage is supplied to the gate electrodes of the relay tubes from a low-power generator or gate control circuit 15. The gate control may be a simple transformer having a center-tapped secondary winding connected to the gate electrodes of the controlled rectifiers 7 and 8 to alternately trigger same in the manner shown in FIGS. 3 and 5 of a copending U.S. application, Ser. No. 488,505, filed concurrently with this application. The primary winding may be coupled to the Maltese cross of the projector by means of a pick-up coil in the manner shown in FIG. 11 of an article in the Philips Technical Review, Volume 21, No. 3, 1959/60, pages 73-82. The supply set is provided with an auxiliary circuit 10, comprising parallel-connected rectifiers 11 and 12, which are connected in common through a potentiometer 13 to the discharge lamp.

What is claimed is:

1. A flashing circuit for a high pressure arc discharge lamp of the type having a pair of electrodes across which a counter voltage is developed which increases from a first given value at the moment of ignition to a second given value when the lamp reaches normal operating conditions, said circuit comprising, a source of alternating voltage, first and second capacitors, means for coupling said capacitors to said voltage source so as to charge said capacitors to a given DC voltage during alternate half cycles of said AC voltage, means for alternately discharging said capacitors across the lamp electrodes during alternate half cycles of said AC voltage to pulse the lamp, and means for starting said lamp flashing comprising means for supplying half wave current pulses to said lamp electrodes at a voltage level which is below said second given value of said counter voltage thereby to produce a switching effect which inhibits the flow of said half wave current pulses to said lamp electrodes upon the lamp reaching said normal operating conditions.

2. A circuit as claimed in claim 1 wherein said voltage source includes a supply transformer having a primary winding connected to the AC voltage supply lines and a secondary winding, said circuit coupling means comprising first and second diodes connecting said first and second capacitors, respectively, to opposite ends of said secondary winding, said starting means comprising third and fourth diodes connected to opposite tap points on said secondary winding, a variable resistor, and means connecting said resistor with said third and fourth diodes in first and second series circuits, respectively, across said lamp electrodes.

3. A movie projector flash lamp circuit comprising, a high pressure arc discharge lamp having a pair of electrodes across which a counter voltage is developed which increases from a given low value at start-up to a given higher value at normal lamp operating conditions, a transformer having a primary winding connected to a source of AC voltage and a center tapped secondary winding, first and second diodes and first and second capacitors, means connecting said first capacitor and said first diode in series across one half of said secondary winding thereby to charge said first capacitor during one half cycle of said AC voltage, means connecting said second capacitor and said second diode in series across the other half of said secondary winding thereby to charge said second capacitor during the opposite half cycle of said AC voltage, synchronous switching means operated by said projector and coupled to said first and second capacitors and to said lamp electrodes so as to alternately discharge said capacitors across said electrodes to pulse the lamp, and auxiliary circuit means for starting said lamp flashing comprising means directly connected to said lamp electrodes for supplying thereto half wave current pulses at a voltage level which is intermediate in value said given low start-up voltage and said given higher normal operating voltage whereby said lamp electrodes are effectively disconnected from said current pulse supplying means upon reaching said normal operating conditions.

4. A circuit as described in claim 3 wherein said synchronous switching means comprises first and second semiconductor controlled rectifiers, means connecting said first controlled rectifier in series circuit with said first capacitor and said lamp, means connecting said second controlled rectifier in series circuit with said second capacitor and said lamp, said auxiliary circuit means comprising third and fourth diodes, means directly connecting said third diode and said lamp in series circuit across a first tap point on said secondary winding and said center tap, means directly connecting said fourth diode and said lamp in second series circuit across a second corresponding but opposite tap point on said secondary winding and said center tap, said third and fourth diodes being poled to conduct in alternate half cycles of said AC voltage.

5. A lamp flashing circuit comprising, a high pressure arc discharge lamp having a pair of electrodes across which a counter voltage is developed which increases from a given low value at start-up to a given higher value at normal lamp operating conditions, a transformer having a primary winding connected to a source of AC voltage and a center tapped secondary winding having first and second terminals on opposite sides of said center tap and third and fourth terminals at intermediate tap points between said center tap and said first and second terminals, respectively, first and second diodes and first and second capacitors, means connecting said first capacitor and said first diode in series circuit between said first terminal and said center tap thereby to charge said first capacitor during one half cycle of said AC voltage, means connecting said second capacitor and said second diode in series circuit between said second terminal and said center tap thereby to charge said second capacitor during the opposite half cycle of said AC voltage, first and second semiconductor controlled rectifiers, an inductor, means connecting said first controlled rectifier, said inductor and said lamp in series circuit across said first capacitor, means connecting said second controlled rectifier, said inductor and said lamp in series circuit across said second capacitor, means for selectively operating said first and second controlled rectifiers so as to alternately discharge said capacitors across said lamp electrodes to pulse the lamp, and auxiliary circuit means for starting said lamp flashing comprising, third and fourth diodes, a variable resistor, means connecting said third diode, said variable resistor, said inductor and said lamp in series circuit between said third terminal and said center tap thereby to supply half wave current pulses to said lamp electrodes at a voltage level which is intermediate said start-up counter voltage value and said normal operating counter voltage value, and means connecting said fourth diode, said variable resistor, said inductor and said lamp in series circuit between said fourth terminal and said center tap thereby to supply half wave current pulses to said lamp electrodes at a voltage level which is intermediate said start-up counter voltage value and said normal operating counter voltage value, whereby said lamp electrodes are effectively disconnected from said third and fourth terminals upon reaching said normal operating conditions.

References Cited

UNITED STATES PATENTS

| | | | |
|---|---|---|---|
| 2,417,489 | 3/1947 | Hasler et al. | 315—237 |
| 2,926,287 | 2/1960 | Bird | 315—289 |
| 3,031,599 | 4/1962 | Paschke et al. | 315—241 |
| 3,127,540 | 3/1964 | Collins | 315—241 |

JOHN W. HUCKERT, *Primary Examiner.*

J. D. CRAIG, *Assistant Examiner.*